Jan. 9, 1968   D. J. MOYNIHAN   3,362,763
SHEET METAL CAGES FOR BALL AND ROLLER BEARINGS
Filed April 26, 1966                2 Sheets-Sheet 1

INVENTOR.
DANIEL J. MOYNIHAN
BY
George C. Bower
his ATTORNEY

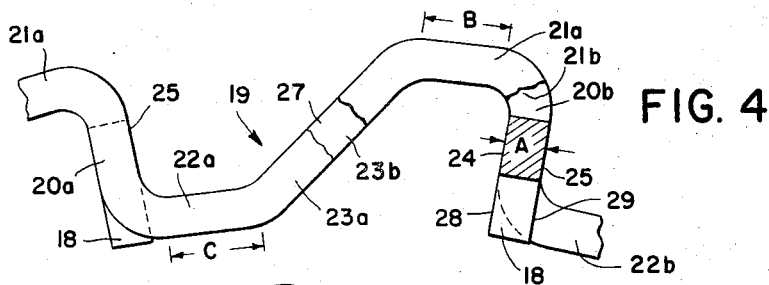
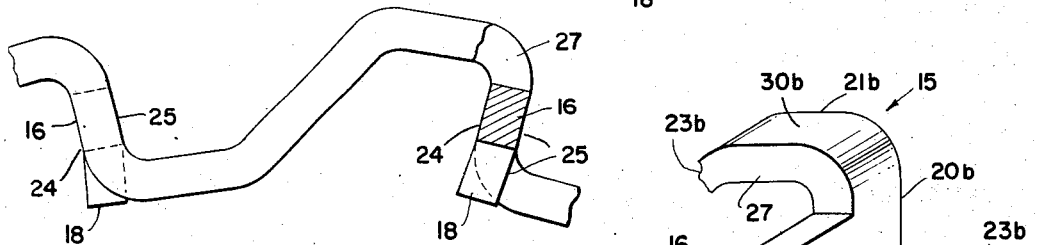
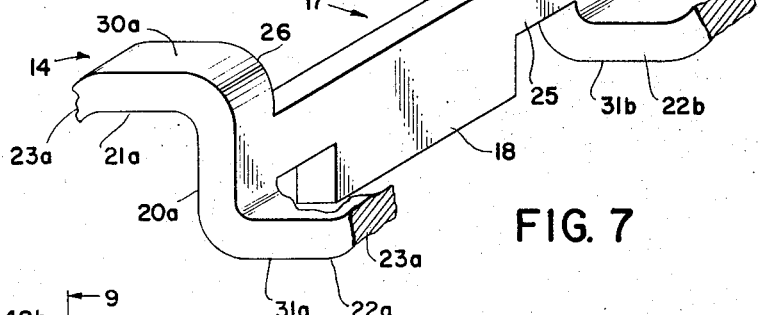
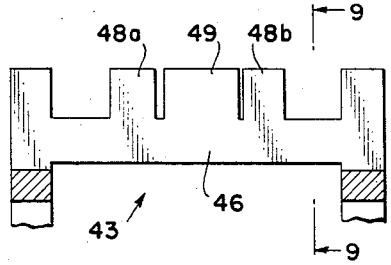
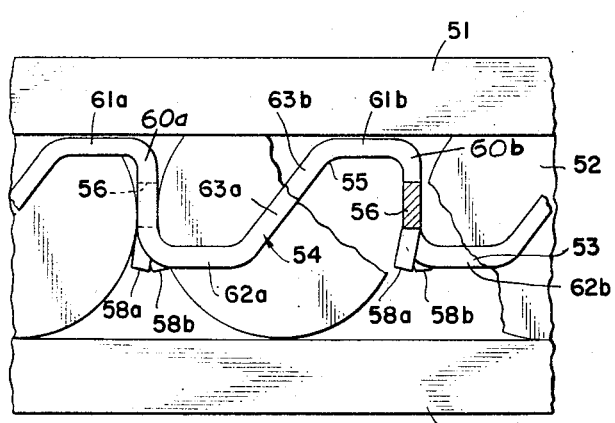

United States Patent Office 3,362,763
Patented Jan. 9, 1968

3,362,763
SHEET METAL CAGES FOR BALL AND
ROLLER BEARINGS
Daniel J. Moynihan, Jamestown, N.Y., assignor to TRW Inc., Euclid, Ohio, a corporation of Ohio
Filed Apr. 26, 1966, Ser. No. 545,381
8 Claims. (Cl. 308—217)

This invention relates to cages for ball and roller bearings and is directed particularly to retainers formed from sheet metal.

Various types of sheet metal cages have been developed for spacing and holding the rolling elements of a bearing. Most of these cages have the tabs engaging the rolling element to be bent radially from a crossbar. The tabs provided surfaces for engagement by the rolling elements. In addition to providing an engaging surface for spacing the rolling element, the tabs also hold the rolling elements in the cage. These prior sheet metal cages had the crossbars extending circumferentially, which reduced the available space for the rolling elements. In order to increase the available circumferential space, a composite cage is used comprising two side plates connected by flat stay rods extending in radial planes. This composite cage has the disadvantage of a large number of parts which have to be manufactured and connected together by riveting the stay rods to the spaced slide plates. This increases the cost of the retainer.

It is, therefore, desirable to provide a cage having the manufacturing economies of the sheet metal type of cages and the maximum circumferential rolling element space of the composite cage. The cage should also provide retaining means for holding the rolling element in the cage. These retaining means for certain applications should precisely hold the rolling elements to a given radial movement.

An object of the invention is to provide sheet metal cages with maximum circumferential rolling element space manufactured in an inexpensive manner.

Another object of the invention is to provide single piece cages with maximum rolling element capacity and means for retaining the elements in the cage when mounted in a single ring bearing.

Another object of the invention is to provide a single piece retainer of sheet metal with maximum rolling element capacity and means for precisely limiting the radial movement of the rolling elements when combined with a ring member.

Other and further objects and advantages will be apparent from the following description taken in connection with the drawings in which FIG. 1 is a fragmentary side view of a roller bearing with a single piece sheet metal cage;

FIG. 4 is an enlarged fragmentary side view of the cage;

FIG. 6 is an enlarged fragmentary side view of the cage with the radial projections bent for precisely limiting the radial movement of the rolling element;

FIG. 7 is a fragmentary perspective view of the cage;

FIG. 8 is a fragmentary view of a cage for separating and holding rolling elements on an inner ring;

FIG. 9 is a sectional view of the cage taken along lines 9—9 of FIG. 8 with the inner and outer rings and rollers fragmentarily shown; and FIG. 10 is a fragmentary side view of a linear roller bearing with a single piece sheet metal cage.

Figure 1:
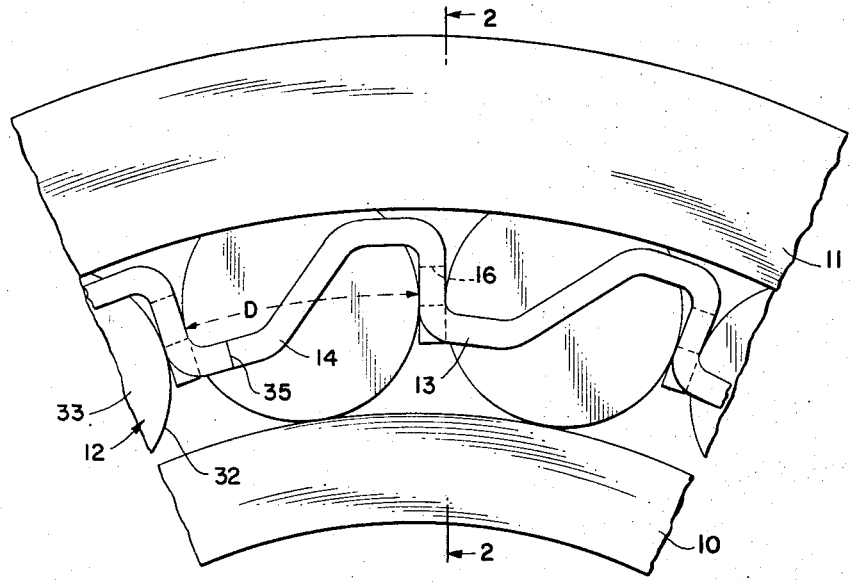
Figure 2:
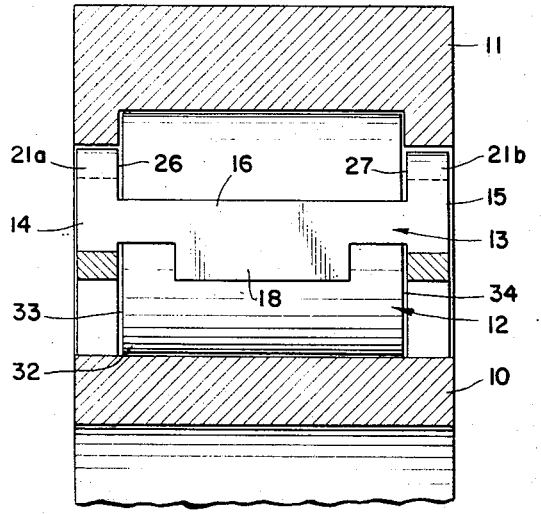
FIG. 2 is a sectional view taken along lines 2—2 of FIG. 1.

In FIG. 1 a roller bearing is illustrated comprising an inner ring member 10, an outer ring member 11, and rollers 12 therebetween. The rollers are spaced by the cage 13 for uniformly spacing the rollers in the bearing. The cage 13 is made in a single piece from sheet metal and has side members or margins 14 and 15 extending circumferentially. Between the side members are crossbars 16 extending between the side members 14 and 15 parallel to the axis of the bearing in the cage for forming pockets 17 with the side members for the reception of the rollers 12. The crossbars 16 have radially extending tabs 18 projecting inward from the crossbars 16.

Figure 5:
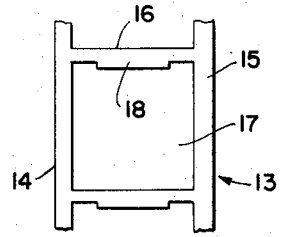
FIG. 5 is a fragmentary view of the stamped cage blank prior to shaping.

The cage is stamped from a planar piece of sheet metal to form the blank illustrated in FIG. 5. The side members 14 and 15, the crossbars 16 and tabs 18 are all in the same plane and have the same thickness A (FIG. 4). The pockets 17 are rectangular in shape. The blank is then formed into the shape as illustrated in FIGS. 1 and 4 to form a plurality of sections 19 of the same shape. Each section forms a pocket 17 and comprises radially extending portions 20a and b, circumferentially extending portions 21a and b, and 22a and b interconnected by the angular portions 23a and b of the side members 14 and 15 (FIG. 7). The crossbars 16 are rotated 90 degrees to extend radially with the portions 20a and b. The tabs 18 on a respective cross bar are also rotated 90 degrees to extend radially in the same plane as the crossbar 16 and the portions 20a and b. The crossbars 16 have surfaces 24 and 25 on opposite sides thereof and facing circumferentially to form wall surfaces to the pockets 17. The portions 21a, b, 22a, b, and 23a, b have facing surfaces 26 and 27, respectively. The surfaces 24 and 25 and the surfaces 26 and 27 define the pockets 17 for holding the rollers 12. The tabs 18 have radially extending surfaces 28 and 29 on opposite sides of a respective tab and facing one another on successive tabs for engagement by the cylindrical surface of the rollers 12.

The portions 21a and b of the side members 14 and 15 have radially outwardly facing surfaces 30a, b extending circumferentially a distance B to function as a pilot surface when the outer ring is the piloting ring for the bearing. Similarly, the portions 22a and b extend circumferentially a distance C to form circumferentially extending inwardly facing surfaces 31a, 31b to function as piloting surfaces when the inner ring is the piloting ring. The portions 21a, b and 22a, b are circumferentially curved or sloped with the cage to conform to the curvature of the rings.

As illustrated in FIG. 7 the circumferentially extending portions 21a and 22a and the radially extending portion 20a, and the circumferentially extending portions 21b and 22b and the radially extending portion 20b form two generally Z-shaped members functioning as inner and outer piloting means supporting the crossbars 16 radially. The angled portions 23a and b form interconnecting means.

The rollers 12 fit in the pockets 17 and the cylindrical surface 32 engages the surfaces 24 and 25. The end surfaces 33 and 34 of the rollers engage the facing surfaces 26 and 27. The spacing D between the surfaces 24 and 25 is in accordance with conventional bearing practices. The rollers 12 engage the crossbars in the lower halves of the surfaces 24 and 25 and preferably in the lower quarter. The tabs 18 being radially inside of the crossbars 16 are circumferentially spaced a lesser distance so that the surfaces 28 and 29 are closer together than the surfaces 24 and 25, and thus prevent the rollers from dropping radially inward. In order to precisely control the inward movement of the rollers the tabs 18 may be bent or curved as shown in FIG. 6. This is particularly desirable when the bearing has only an outer ring and is sold to be mounted directly on a shaft. For easy mounting of the bearing on a shaft, the rollers cannot extend inwardly greater than the taper of the end of the rotating shaft.

In the embodiment illustrated in FIG. 1 the outer ring member 11 is the pilot ring. However, in accordance with conventional bearing practices the inner ring 10 may be the pilot ring in cooperation with the surfaces 31a and b of the portions 22a and b of the side members 14 and 15. Also the tab 18, instead of extending radially inward from the crossbars 16, may extend radially outward and be bent circumferentially to retain the rollers in the pockets 17. The cage as illustrated in FIG. 4 is precisely and proportionally drawn as to the dimensions of the various parts.

As illustrated in FIGS. 8 and 9 the cage 43 has crossbar 46 with tabs 48a, b and 49 extending outwardly and bent into a retaining position. The outer tabs 48a, b are bent in the same direction and tab 49 is bent in the opposite direction to cooperate with the tabs of the adjacent crossbars to retain the rollers 42 in the cage. Thus the cage may be used to hold rollers on an inner ring.

In FIG. 9 the inner ring 40 is the pilot ring with the surfaces 41a, b on the cage forming the pilot surfaces. The rollers 42 engage the crossbars 46 along the outer halves of the surfaces of the crossbars.

Figure 3:
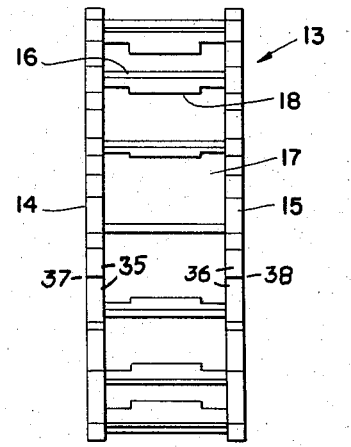
FIG. 3 is a top view of the cage.

The cage blank is formed into a cylindrical shape and the abutting ends 35, 36 are butt welded, brazed or otherwise secured together to form rigid bonds at 37, 38 (FIG. 3). Thus a single piece cage is made.

In the foregoing embodiment the cage is described in connection with a circular bearing. However, it can also be used in bearings of other configurations. In FIG. 10 the cage is fragmentarily illustrated in a linear bearing. The lower race 50 and the upper race 51 are planar and the rollers 52 are separated by the cage 53. The portions 60a and 60b of the side members 54 and 55 extend transversely or normal to the races 50 and 51 and the path of travel of the rollers 52. The crossbars 56 extend between the crossbar supporting portions 60a, 60b parallel to the race 51. The tabs 58a and 58b are spread and bent in opposite directions for retaining the rollers 52. Of course, as in the previous embodiment the tabs or tangs 58a and 58b may extend above or below the crossbars 56. The piloting portions 61a, 61b, 62a, 62b extend parallel to the races 50 and 51. In this embodiment the upper race 51 is the piloting race. However, the lower race 50 could be the piloting race depending upon the use and design of the bearing. The Z-shaped sections formed by the portions 61a, 60a, 62a and the portions 61b, 60b and 62b are connected by the angled portions 63a and 63b.

The foregoing embodiments describe the invention in connection with roller bearings. It is understood that in accordance with bearing practices cages could be modified for use in spacing and retaining balls in a ball bearing. Instead of the pocket 17 being rectangular in shape, it would be square to accommodate the spherical shape of the bearing balls. The retaining tabs would be the same. Thus the invention is applicable to both roller and ball bearings.

It is thus seen from the foregoing detailed description that the circumferentially or linearly extending side members have radially or transversely extending portions which support the crossbars between the rolling elements where the rolling elements are closest to provide surfaces for engagement by the rolling elements. The crossbars 16 extend in the radial or transverse planes containing the respective crossbar carrying portions. Thus the smaller thickness dimension of the crossbar is in the direction of travel of the rolling elements, while the greater width dimension provides the surfaces facing the rollers for engagement.

In the embodiment of FIG. 1 the radial portions of the side members have at their inner and outer ends circumferentially extending portions 21a, 21b and 22a, 22b, respectively, shaped to curve the cage in a circular shape and provide piloting surfaces 30a, 30b, 31a, 31b. In the embodiment of FIG. 10 the crossbar carrying portions extend normally to the races and the piloting portions are parallel. These portions of the side members form a plurality of Z configurations or sections corresponding to the number of rolling elements and are connected and spaced by the angled portions to form the cage. The Z configuration positions the crossbar or rolling spacing member in spacing position between the rolling elements and provides piloting surfaces for piloting on either race.

Thus the stamped sheet metal strip of FIG. 5 is formed into a single piece cage with the bars presenting a minimum dimension between the rolling elements and thus providing maximum space for the rolling elements. This is attained while still providing a tab or tang for retaining the rolling elements in the cage. These are also provided within the area occupied by the crossbars and may be bent for precision retention within this area due to the curvature of the rolling elements. The radially extending side surfaces of the crossbars provide excellent contacting areas for the rolling elements, either roller or ball, and may be designed in width and located to provide the area of contact in accordance with the best bearing practices. The inwardly facing side surfaces of the side members may be engaged by the end surfaces of the rollers with a minimum of friction.

The sinuous shape of the side members and the spaces above and below the crossbar provide for flow of lubrication in the bearing. Further, the smoothly curved connection between the various portions of the side members and the axial length of the tab and the single piece construction of the tabs with the crossbars eliminate any small projecting pieces that may become broken to interfere with or destroy the bearing. The single piece construction of the entire cage contributes to the reliability and life of the bearing.

It is, of course, obvious that the stamping and shaping operations and the final fastening of the ends to form a unitary single piece cage render the manufacture of the cage inexpensive. It is, therefore, seen that an inexpensive cage of high reliability and maximum capacity for retaining and spacing rolling elements has been attained.

Various modifications and adaptations may be made to the cage without departing from the invention as set forth in the appended claims.

I claim:

1. A unitary cage for an antifriction bearing having first and second races with rolling elements therebetween comprising two side members extending longitudinally to said races when mounted therein, crossbars extending laterally to said side members and therebetween to form pockets for rolling elements, said side members having generally Z-shaped sections formed by transverse portions and longitudinal portions at opposite ends of said transverse portions and extending longitudinally in opposite directions therefrom to provide piloting surfaces, and said crossbars connected to said transverse portions in a transverse plane and having surfaces of substantial transverse dimensions on opposite sides facing said pockets for engagement by rolling elements in said pockets and having a minimal longitudinal thickness for minimally spacing rolling elements in said pockets.

2. A single piece stamped cage for an antifriction bearing having first and second race rings with rolling elements therebetween comprising two spaced side members and crossbars extending therebetween stamped from a single piece of sheet metal, said side members being formed with Z-shaped sections having radially extending portions formed as part of said crossbars to position said crossbars in radial planes forming rolling elements containing pockets with a minimum of circumferential spacing between rolling elements when mounted therein.

3. A cage for an antifriction bearing having first and second race rings with rolling elements therebetween comprising two axially spaced circumferentially continuous side members having generally Z-shaped sections formed by radially extending portions and circumferentially extending portions at opposite ends of said radial portions and extending in opposite circumferential directions therefrom, crossbars radially supported by said radially extending portions of said side members with the radial dimension substantially greater than the circumferential dimension to form pockets for rolling elements with a minimum of circumferential spacing between rolling elements when mounted therein.

4. A cage as set forth in claim 3 wherein said circumferentially extending portions form piloting means adapted to engage one of the rings of a bearing.

5. A cage as set forth in claim 3 wherein said crossbar has generally radially extending tabs for retaining rolling elements in said pockets.

6. A cage as set forth in claim 3 wherein said side members have angulated portions connecting said circumferentially extending portions.

7. A cage as set forth in claim 1 wherein said longitudinal portions are linear and said transverse portions are normal thereto.

8. A bearing comprising an inner ring having a race and an outer ring having an outer race, rolling elements between said rings engaging said races, a single piece cage stamped from sheet metal of a given thickness positioned between said rings for spacing said rolling elements, said cage having two axially spaced side members bent into generally Z-shaped sections with radially extending portions and inner and outer portions circumferentially extending in opposite directions from said radially extending portions, crossbars supported by said radially extending portions in radial planes and having side surfaces forming pockets with said circumferentially extending portions and the given thickness of the crossbar positioned circumferentially to minimally space the rolling elements circumferentially while said inner or outer portions form piloting means with a respective ring.

UNITED STATES PATENTS

References Cited

2,404,642  7/1946  Lewis _____ 308—218

MARTIN P. SCHWADRON, *Primary Examiner.*

FRANK SUSKO, *Examiner.*